United States Patent [19]

Iwata

[11] Patent Number: 5,140,962
[45] Date of Patent: Aug. 25, 1992

[54] KNOCK SENSING APPARATUS FOR AN INTERNAL COMBUSTION ENGINE

[75] Inventor: Toshio Iwata, Himeji, Japan

[73] Assignee: Mitsubishi Denki K.K., Tokyo, Japan

[21] Appl. No.: 603,353

[22] Filed: Oct. 26, 1990

[30] Foreign Application Priority Data

Oct. 30, 1989 [JP] Japan ................... 1-279930
Oct. 30, 1989 [JP] Japan ................... 1-279931

[51] Int. Cl.$^5$ ............................................... F02P 5/14
[52] U.S. Cl. ................................................ 123/425
[58] Field of Search ............ 123/425, 416, 417, 435; 364/431.07, 431.08

[56] References Cited

U.S. PATENT DOCUMENTS

| | | | |
|---|---|---|---|
| 4,711,213 | 12/1987 | Sakakibara et al. | 123/425 |
| 4,729,358 | 3/1988 | Morita et al. | 123/416 |
| 4,736,723 | 4/1988 | Nagar | 123/425 |
| 4,760,828 | 8/1988 | Shimada et al. | 123/425 |
| 4,766,545 | 8/1988 | Nagar | 123/425 |
| 4,770,144 | 9/1988 | Sakakibara et al. | 123/425 |
| 4,774,922 | 10/1988 | Morita | 123/425 |
| 4,790,281 | 12/1988 | Micro et al. | 123/425 |
| 4,951,630 | 8/1990 | Iwata | 123/435 |
| 4,971,007 | 11/1990 | Gopp et al. | 123/425 |

Primary Examiner—Raymond A. Nelli
Attorney, Agent, or Firm—Sughrue, Mion, Zinn Macpeak & Seas

[57] ABSTRACT

A knock sensing apparatus for a multi-cyclinder internal combustion engine has a knock sensor that generates an electrical output signal corresponding to vibrations of the engine. A peak hold circuit generates a level signal indicating the level of the output signal of the knock sensor during a prescribed period. The level signal is compared with a threshold determined by the operating region of the engine. When the level signal exceeds the threshold level, it is determined that the engine is knocking. According to one form of the present invention, the threshold is determined on the basis of the output signals from a plurality of sensors for sensing different operating conditions of the engine. In a preferred embodiment, the sensors include a sensor for sensing an indication of the engine rotational speed and an engine load sensor. According to another form of the present invention, the threshold is then corrected in accordance with the difference between the actual noise level of the engine as indicated by an average of the level signal and an expected noise level determined by the operating condition detected by the sensor. The corrected threshold is then compared with the level signal to determine if knocking is taking place.

19 Claims, 4 Drawing Sheets

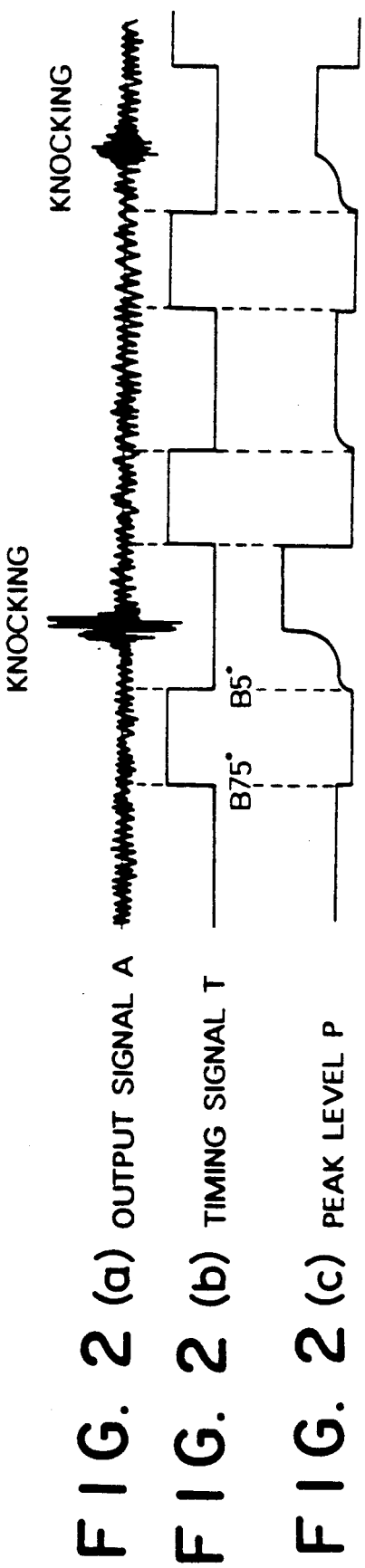
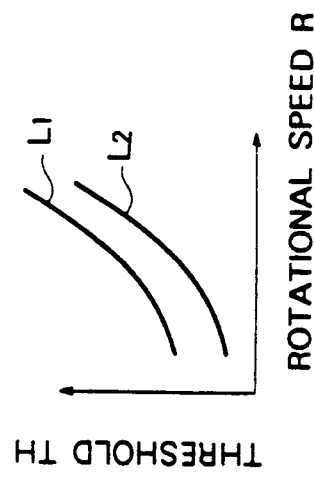
FIG. 2 (a) OUTPUT SIGNAL A
FIG. 2 (b) TIMING SIGNAL T
FIG. 2 (c) PEAK LEVEL P
FIG. 3

KNOCK SENSING APPARATUS FOR AN INTERNAL COMBUSTION ENGINE

BACKGROUND OF THE INVENTION

This invention relates to a knock sensing apparatus for sensing knocking in an internal combustion engine. Engine knocking is a form of engine vibration that occurs due to improper combustion in the cylinders of an engine. Prolonged knocking can damage an engine, so many engines are equipped with a knock sensing apparatus that senses engine vibrations due to knocking. When knocking is sensed, an operating parameter of the engine is adjusted so as to suppress the knocking. The most common method of suppressing knocking is to retard the ignition timing of the engine to the point that knocking no longer occurs.

A typical knock sensing apparatus includes a knock sensor in the form of an acceleration sensor that is mounted on the engine and generates an electrical output signal in response to engine vibrations. The output signal of the knock sensor is processed to separate components of the signal due to knocking from components due to miscellaneous mechanical vibrations and electrical noise. The ignition timing of the engine is then retarded until signal components due to knocking can no longer be detected.

The signal processing that must be performed on the output signal of the knock sensor is complicated, so a conventional knock sensing apparatus employs a considerable number of discrete electronic hardware components for carrying out the signal processing. The large number of components makes a conventional knock sensing apparatus bulky, and because of the labor required to assemble the components, the manufacturing costs are high. Furthermore, the characteristics of the individual hardware components of a conventional knock sensing apparatus can not be easily or widely adjusted, so the degree of freedom of control of the knock sensing apparatus is limited.

SUMMARY OF THE INVENTION

Accordingly, it is an object of the present invention to provide a knock sensing apparatus for an internal combustion engine that employs fewer hardware components than a conventional knock sensing apparatus and permits greater freedom of control.

It is another object of the present invention to provide a knock sensing apparatus that can accurately sense knocking even when the operating conditions of an engine change.

It is yet another object of the present invention to provide a knock sensing apparatus that can compensate for variations among the noise levels of mass-produced engines.

A knock sensing apparatus for a multi-cylinder internal combustion engine according to the present invention has a knock sensor that generates an electrical output signal corresponding to vibrations of the engine. A level indicating means generates a level signal indicating the level of the output signal of the knock sensor during a prescribed period. The level signal is compared with a threshold determined by the operating region of the engine. When the level signal exceeds the threshold level, it is determined that the engine is knocking.

According to one form of the present invention, the threshold is determined on the basis of the output signals from a plurality of sensors for sensing different operating conditions of the engine. In a preferred embodiment, the sensors comprise a sensor for sensing an indication of the engine rotational speed and an engine load sensor. By setting the threshold in accordance with a plurality of operating conditions, the threshold can be accurately adjusted for changes in the engine noise level due to changing operating conditions.

According to another form of the present invention, a threshold is determined on the basis of the output signal of at least one sensor for sensing an operating condition of the engine. The threshold is then corrected in accordance with the difference between the actual noise level of the engine as indicated by an average of the level signal and an expected noise level determined by the operating condition detected by the sensor. The corrected threshold is then compared with the level signal to determine if knocking is taking place.

By correcting the threshold, variations among the noise levels of mass-produced engines can be compensated for, and knock sensing can be more accurately performed.

BRIEF DESCRIPTION OF THE DRAWINGS

FIG. 2 consisting of wave form diagrams (a), (b) and (c) show the knock sensor output signal, the timing signal, and the peak level signal for the embodiment of FIG. 1.

FIG. 3 is a graph illustrating an example of a relationship between the engine rotational speed, the engine load, and the threshold for knock determination.

DESCRIPTION OF THE PREFERRED EMBODIMENTS

Figure 1:
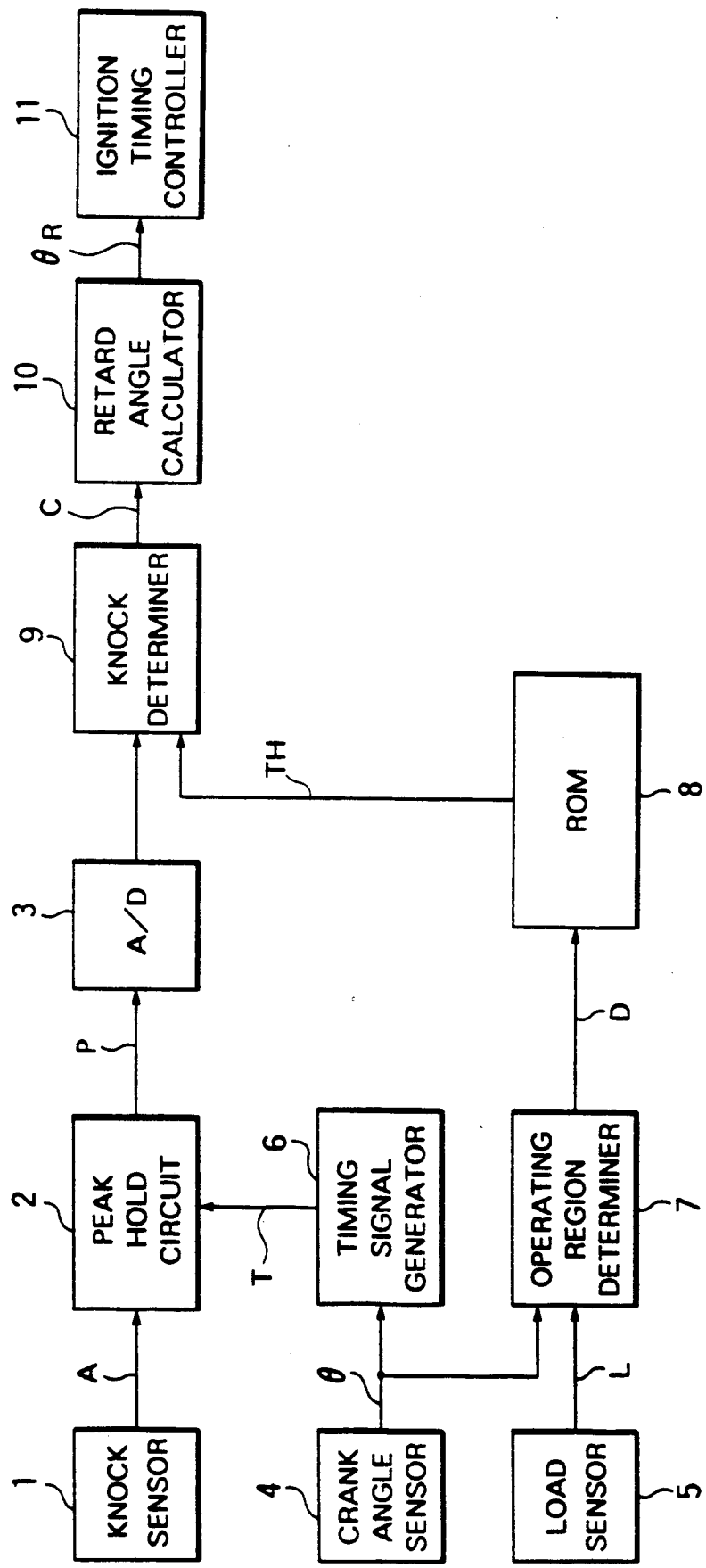
FIG. 1 is a block diagram conceptually illustrating a first embodiment of a knock sensing apparatus according to the present invention.

FIG. 1 conceptually illustrates a first embodiment of a knock sensing apparatus according to the present invention. As shown in this figure, a conventional knock sensor 1 for sensing engine vibrations is mounted on a suitable portion of an unillustrated multi-cylinder internal combustion engine. Although a plurality of knock sensors 1 can be used to detect vibrations of individual cylinders of the engine, for simplicity, the case will be described in which a single knock sensor 1 is employed to detect vibrations of all the cylinders. The mounting location of the knock sensor 1 will depend on the structure of the engine but should be a location where engine vibrations can be easily picked up. The knock sensor 1 is an accelerometer, such as one using a piezo-electric element, that when vibrated generates an electrical output signal having a magnitude corresponding to the strength of the vibrations. Line (a) of FIG. 2 illustrates the output signal A of the knock sensor 1. The engine is always producing vibrations, so even when knocking is not taking place, the output signal A of the knock sensor 1 includes low-amplitude oscillations due to normal engine mechanical vibrations (caused by the opening and closing of engine valves, for example) and electrical noise. However, when knocking occurs, the amplitude of the output signal A sharply increases. Knocking is produced by combustion in the cylinders of an engine, so the large-amplitude oscillations of the output signal A due to knocking generally take place when the position of the piston in a cylinder in which knocking is occurring is in the range of 10°–60 degrees after top dead center (ATDC).

The output signal A of the knock sensor 1 is input to a level sensor in the form of a peak hold circuit 2 that generates a peak level signal P indicating the peak level of the output signal A during a prescribed period and maintains this signal P until reset. Line (c) of FIG. 2 illustrates an example of the output signal of the peak hold circuit 2. The peak level signal P is converted into a digital signal by an A/D converter 3.

A crank angle sensor 4 senses the rotation of some portion of the engine (generally the crankshaft or the camshaft) and generates a crank angle signal $\Theta$ that changes in value each time one of the pistons of the engine is at a prescribed position with respect to top dead center (TDC). The crank angle signal $\Theta$ is input to a timing signal generator 6 that generates a timing signal T that resets the peak hold circuit 2 at a prescribed piston position. Line (b) of FIG. 2 illustrates an example of the timing signal T. It is in the form of pulses having a rising edge each time one of the pistons of the engine is at a first piston position (75 degrees before top dead center (BTDC), for example) and a falling edge each time one of the pistons is at a second piston position (5 degrees BTDC, for example). In this example, the peak hold circuit 2 is enabled when the timing signal T has a low value and is disabled when the timing signal T has a high value. Furthermore, the peak hold circuit 2 is reset upon every rising edge of the timing signal T. Crank angle sensors for generating an output signal at prescribed crankshaft angles are well known to those skilled in the art, and any suitable type can be employed.

A plurality of sensors are provided for sensing different operating conditions of the engine. In the embodiment of FIG. 1, the plurality of sensors comprises the crank angle sensor 4 and a load sensor 5. The load sensor 5 senses an operating condition of the vehicle indicative of the load on the engine and generates a load signal L. The load sensor 5 is, for example, a semiconductor pressure sensor that senses the vacuum in the intake manifold of the engine.

The output signals from the crank angle sensor 4 and the load sensor 5 are input to an operating region determiner 7 that selects an engine operating region D based on the engine rotational speed and the engine load and generates a corresponding output signal. The operating region determiner 7 includes a rotational speed sensor that calculates the engine rotational speed N from on the crank angle signal $\Theta$. It also includes an internal memory in which the relationship between the rotational speed N, the engine load L, and the engine operating regions D is stored in the form of a 2-dimensional table. After calculating the rotational speed N, the operating region determiner 7 refers to its internal memory and outputs an operating region signal indicating the operating region D selected from the memory table.

For each engine operating region D, there is a corresponding threshold TH, which is a level used for knocking determination. The threshold TH for each operating region D is stored in a ROM 8. Each time the operating region D is determined by the operating region determiner 7, the ROM 8 is referred to, and threshold signal indicating the threshold TH corresponding to the operating region D is generated.

There is a one-to-one correspondence between the operating regions D and the thresholds TH. Therefore, it is possible to delete the intermediate step of determining the operating region D and to directly determine the threshold TH from the rotational speed N and the load L. For example, the memory in the operating region determiner 7 for storing a relationship between the engine rotational speed N, the engine load L, and the operating region D, and the ROM 8 for storing a relationship between the engine operating region D and the threshold TH can be replaced by a single memory storing a relationship between the engine rotational speed N, the engine load L, and the threshold TH.

Furthermore, because of the one-to-one correspondence between the operating regions D and the thresholds TH in this embodiment, it can be seen that the threshold TH is in effect a function of a plurality of engine operating conditions, i.e., the engine rotational speed N and the engine load L. The reason for determining the threshold TH on the basis of a plurality of engine operating conditions is that the engine noise level can not be completely determined by a single operating condition, such as the engine rotational speed N. Although the engine noise increases as the engine rotational speed N increases, even at a low rotational speed, when the engine load L is light, the engine noise level is high and sensing of knocking is difficult. Therefore, if the threshold TH were a function only of the engine rotational speed N, the threshold TH would have a low level at a time of low rpm and a light load. Due to the high noise level at this time, accurate knock sensing could not be performed.

Therefore, in this embodiment, the relationship between the rotational speed, the load L, the operating region D, and the threshold TH is such that the threshold TH increases as the rotational speed N increases. Furthermore, the threshold TH is made to increase as the engine load L decreases at a constant engine rotational speed L. FIG. 3 conceptually illustrates an example of the relationship between the engine rotational speed N, the engine load L, and the threshold TH. L1 and L2 are two different load levels, with L1<L2. As a result, even at a low engine rotational speed N and a light load L, the threshold TH is set at a high enough level so that the high engine noise level under these operating conditions will not prevent accurate knock sensing.

The output signal from the A/D converter 3 and the threshold signal TH from the ROM 8 are input to a knock determiner 9. The knock determiner 9 compares the peak level signal P and the threshold signal TH and generates an output signal C which indicates whether knocking is occurring. The knock determiner 9 can comprise a comparator that generates an output signal C that changes in value (between a high level and a low level, for example) when the peak level signal P exceeds the threshold signal TH. Alternatively, the knock determiner 9 can comprise a differential amplifier that generates an output signal C having a magnitude proportional to the difference between the level of the peak level signal P and the level of the threshold signal TH.

The output signal C from the knock determiner 9 is input to a retard angle calculator 10 that calculates a retard angle $\Theta_R$ and generates a corresponding output signal for input to an ignition timing controller 11. The retard angle $\Theta_R$ is the angle by which the ignition timing of the engine is retarded with respect to a basic ignition timing, which is the ignition timing for best efficiency in the absence of knocking given the present engine operating conditions. The basic ignition timing is calculated by the ignition timing controller 11 based on various engine operating parameters, such as the engine rotational speed as indicated by the output of the crank angle sensor 4 and the engine load sensed by the load sensor 5. Algorithms that can be used by the ignition timing controller 11 for calculating the basic ignition timing are well-known to those skilled in the art. After determining the basic ignition timing, the ignition timing controller 11 calculates a corrected ignition timing by subtracting the retard angle $\Theta_R$ from the basic ignition timing. It then uses the corrected ignition timing to control the timing with which the unillustrated spark plugs of the engine are fired.

The retard angle calculator 10 changes the retard angle $\Theta_R$ incrementally. When the output signal of the knock determiner 9 indicates that knocking is taking place, the retard angle calculator 10 increases the retard angle $\Theta_R$ in a step-wise manner at prescribed intervals. When the output signal C of the knock determiner 9 changes to a level indicating that knocking is no longer taking place, after a prescribed length of time has elapsed, the retard angle calculator 10 reduces the retard angle $\Theta_R$ back towards 0 in a step-wise manner. By the repeated adjustment of the retard angle $\Theta_R$, the engine is operated as close as possible to the basic ignition timing for best efficiency without knocking taking place.

If the knock determiner 9 comprises a differential amplifier and its output signal C is proportional to the magnitude of the difference between the peak level signal P and the threshold TH, the retard angle calculator 10 can be made to adjust the retard angle $\Theta_R$ in increments proportional corresponding to the magnitude of output signal C. Thus, the retard angle calculator 10 can be made to change the retard angle $\Theta_R$ rapidly (in large increments) when C has a high level and to change the retard angle $\Theta_R$ more gradually (in smaller increments) when C has a low level.

It is possible for elements 6–11 of FIG. 1 to comprise discrete electronic components interconnected in the manner shown in the figure. Preferably, however, these elements comprise a microcomputer having a CPU that performs the functions of elements 6–11 by means of software. Most modern engines are already equipped with an electronic control unit having a microcomputer for controlling ignition timing, fuel injection, and other aspects of engine operation. An existing microcomputer for an electronic control unit can be adapted to perform the functions of elements 6–11 of FIG. 1 simply by altering the programs executed by the microcomputer.

Since elements 6–11 can comprise a microcomputer, a knock sensing apparatus according to the present invention can be manufactured using a very small number of hardware components. As a result, hardware costs and assembly costs are low, and a small-sized apparatus can be achieved. Furthermore, since the functions of these elements can be performed by software, variations in the manner of operation of the apparatus can be easily made by changing the software executed by the microcomputer. This permits great freedom of control by the apparatus.

The embodiment of FIG. 1 has only 2 sensors for sensing engine operating conditions. However, it is possible to employ a larger number of sensors, and it is possible to employ other types of sensors. For example, a temperature sensor for sensing the cooling water temperature of an engine can be used as one of the plurality of sensors. In this case, the operating region determiner 7 would select the operating region D so that the threshold TH would increase as the cooling water temperature increased.

When a knock sensing apparatus according to the present invention is applied to mass-produced engines, the thresholds TH stored in the ROM 8 and used for knock determining are values which are empirically determined so that knocking can be accurately sensed in the typical engine. However, due to manufacturing discrepancies, no two mass-produced engines are alike, so the noise level in two different engines of the same type can differ significantly even when operating under identical conditions. Similarly, no two mass-produced knock sensors are exactly alike, and the output characteristics of two nominally identical sensors can be different even though the noise levels being measured by each sensor are identical.

Due to such variations among engines and knock sensors, the predetermined threshold TH for a given engine operating region D may be too high or too low. If the threshold TH is too high, the peak level P can not exceed the threshold TH even when knocking is taking place, so knocking will not be sensed and suppressed. On the other hand, if the threshold TH is too low, then fluctuations in the peak level signal P due to sources other than knocking, such as random mechanical vibrations, will cause the peak level P to frequently exceeds the threshold TH, so the knock determiner 9 will determine that knocking is taking place even when the engine is actually operating normally. In this case, the ignition timing will be unnecessarily retarded, and the engine will operate inefficiently.

Figure 4:
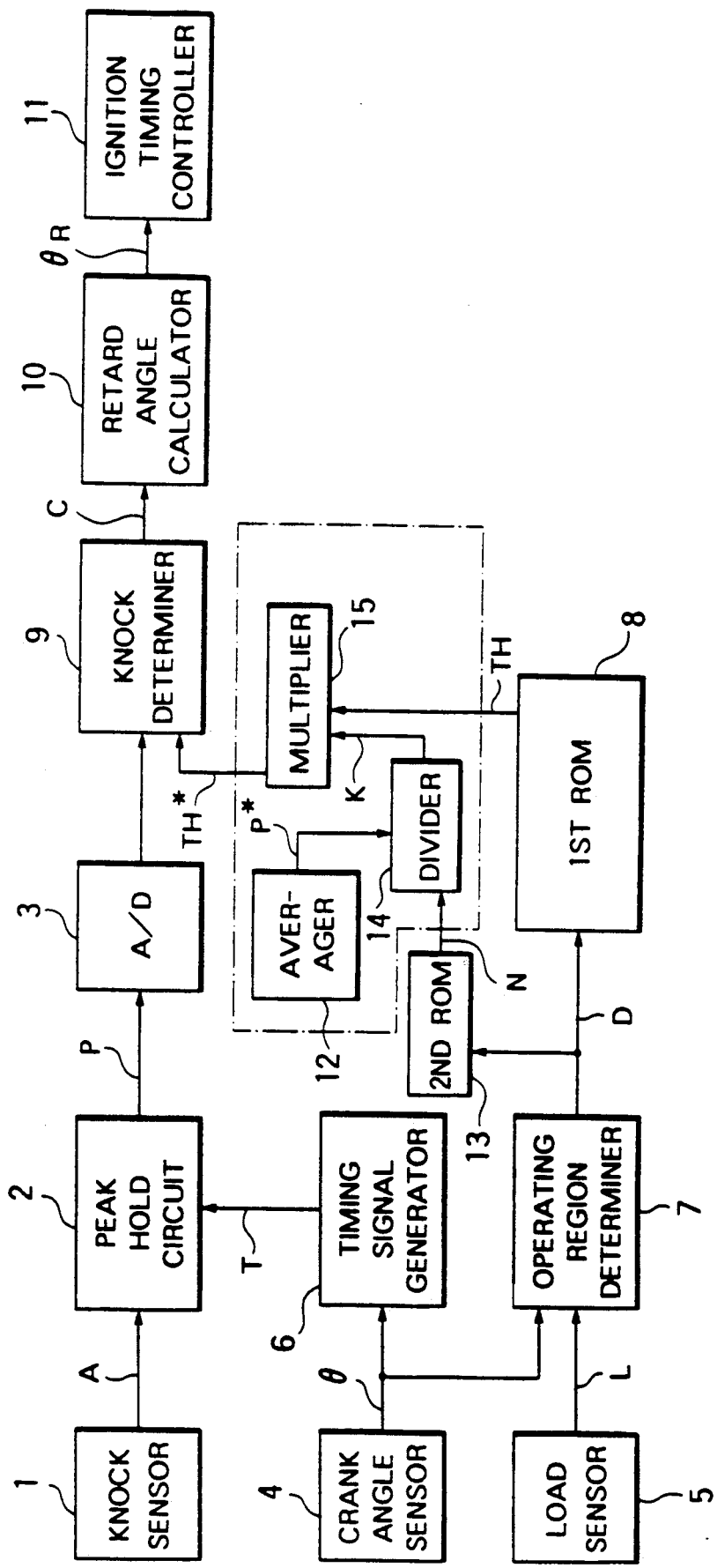
FIG. 4 is a block diagram conceptually illustrating a second embodiment of the present invention.

This problem is solved in a second embodiment of the present invention, which is schematically illustrated in FIG. 4. In this embodiment, a threshold signal TH is corrected for the actual noise level of an engine in the absence of knocking to obtain a corrected threshold TH*, and knock determination is performed based on the corrected threshold TH*.

The structure of this embodiment is similar to that of the embodiment of FIG. 1, and the same reference numerals indicate corresponding parts. In addition to the elements of the embodiment of FIG. 1, this embodiment further includes elements 12–15. Element number 12 is an averager 12 that averages the peak level signal P from the peak hold circuit 2 over a prescribed number of crankshaft rotations of the engine and generates an average signal P*. The average signal P* is an indication of the noise level of the engine in the absence of knocking. A first ROM 8 corresponding to ROM 8 of FIG. 1 contains a memory table that gives a threshold TH for each operating region D of the engine. A second ROM 13 contains a memory table that gives a reference noise level N for each operating region D. The reference noise level N expresses the expected noise level, i.e., the expected level of the peak level signal P in a typical engine in a given operating region D. For each operating region D, the corresponding threshold TH stored in the first ROM 8 is the threshold that is appropriate for knock sensing when the engine noise level equals the reference noise level N corresponding to that operating region D.

At prescribed intervals, the reference noise level N from the second ROM 13 and the average signal P* from the averager 12 are input to a divider 14, which divides the average signal P* by the reference noise level N and generates an output signal indicating the value of the ratio K=P*/N. The output signal from the divider 14 and the threshold signal TH from the first ROM 8 are input to a multiplier 15, which calculates a corrected threshold TH* having the value TH*=K×TH. The output signal of the multiplier 15 (the corrected threshold TH*) is then input to a knock determiner 9, which compares the corrected threshold TH* with the digitized value of the peak level signal P from an A/D converter 3 and generates an output signal C indicating the result of comparison. Based on the output signal C, the ignition timing is controlled in the same manner as in the first embodiment.

If the average signal P* equals the reference noise level N, then K will have a value of 1, and the corrected threshold TH* will equal the threshold TH. If the average signal P* is greater than the reference noise level N, this means that the engine noise level is higher than the expected noise level for the present operating region D, so K will be greater than 1, and TH* will be greater than TH. As a result, the threshold for knock determination is increased, and mistaken sensing of knocking by the knock determiner 9 can be prevented. On the other hand, if the average signal P* is less than the reference noise level N, it means that the engine noise level is lower than expected for the present operating region D, so K will be less than 1, and TH* will be less than TH. As a result, the threshold for knock determination by the knock determiner 9 will be lowered, and knocking signals can be accurately detected despite the low level of the peak level signal P.

Elements 6-15 of FIG. 4 preferably comprise a microcomputer that performs the functions of these elements by executing a program.

Figure 5:
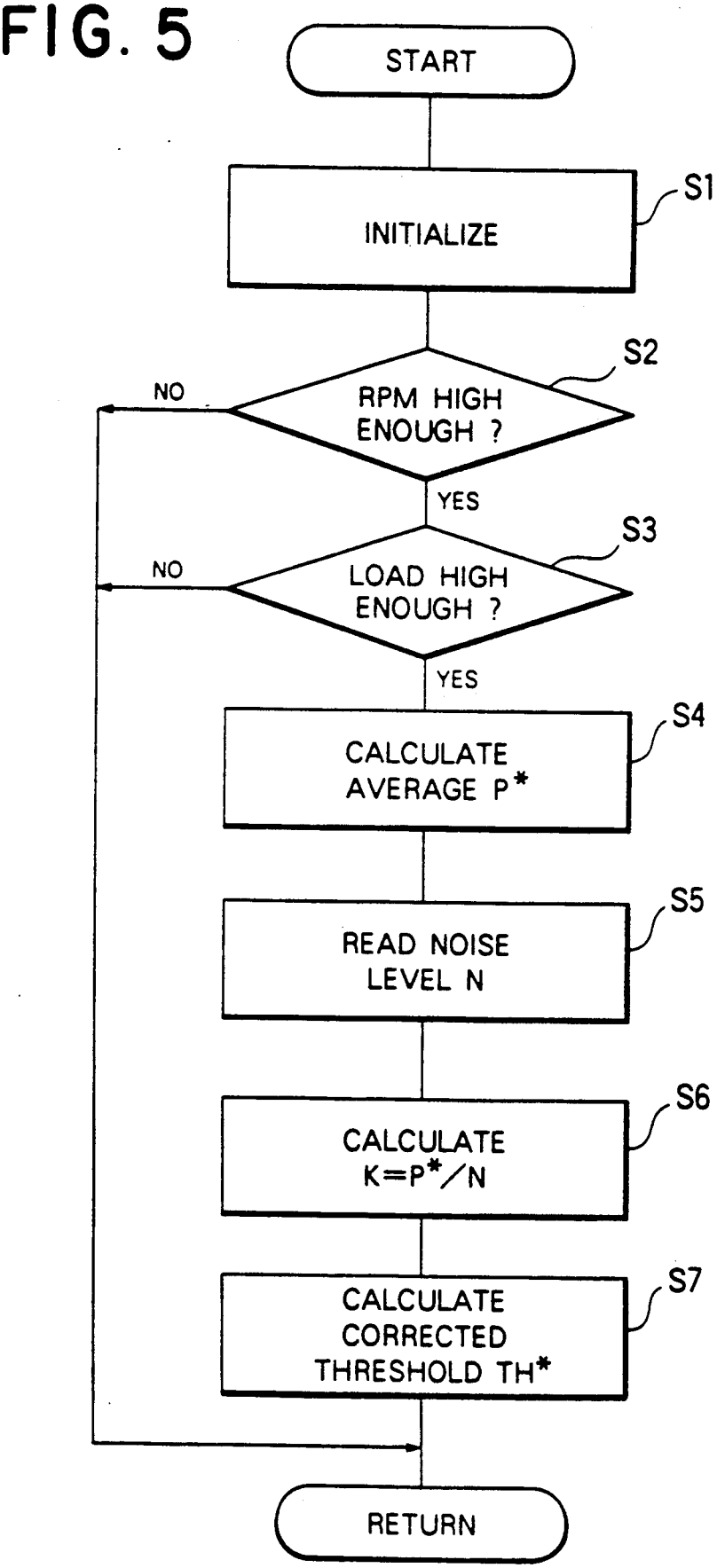
FIG. 5 is a flow chart of the operation of the embodiment of FIG. 4.

FIG. 5 is a flow chart of a method performed by the embodiment of FIG. 4 for correcting the threshold TH. In Step S1, various flags and variables used in the program are initialized. Next, in Steps S2 and S3, it is determined whether the engine rotational speed and the engine load are high enough to perform knock sensing. If either the engine rotational speed or the engine load is below a corresponding lower limit, a return is performed. If each of these is greater than or equal to the corresponding lower limit, then in Step S4, the averager 12 calculates the current average P* of the peak level signal P. In Step S5, the reference noise level N is read from the second ROM 13, and in Step S6, the ratio K=P*/N is calculated by the divider 14. In Step S7, a corrected threshold TH* is calculated by the multiplier 15 using the formula TH*=K×TH, after which a return is performed.

The program of FIG. 5 can be performed as frequently as desired. For example, it can be performed each time a new peak level signal P is generated, which in the embodiment of FIG. 4 is each time any piston of the engine is at the first piston position of 75 BTDC.

The embodiment of FIG. 4 employs a plurality of sensors (a crank angle sensor 4 and a load sensor 5) for sensing the engine operating conditions. While it is possible to determine the engine operating region D on the basis of the output of a single operating sensor, as discussed with respect to the embodiment of FIG. 1, the operating region D can be determined more precisely by employing a plurality of sensors.

The embodiments of FIGS. 1 and 4 use a peak hold circuit 2 to generate a level signal indicative of the level of the output signal A of the knock sensor 1, but a different device can be used for this purpose. For example, the peak hold circuit 2 can be replaced by an integrator that integrates the output signal of the knock sensor 1 over a prescribed period and generates a level signal corresponding to the integrated value.

As mentioned above, a knocking apparatus according to the present invention can employ more than a single knock sensor 1. For example, a separate knock sensor 1 can be mounted on each cylinder of an engine. Alternatively, if the cylinders are divided into banks, a separate knock sensor 1 can be mounted on each bank.

What is claimed is:

1. A knock sensing apparatus for an internal combustion engine comprising:
   a knock sensor that generates an electrical output signal corresponding to vibrations of an engine;
   level indicating means for generating a level signal indicating a level of the output signal of the knock sensor during a predetermined period;
   a plurality of sensors for collectively sensing a plurality of operating conditions of the engine;
   threshold determining means responsive to outputs of the plurality of sensors for selecting a threshold value indicative of the plurality of operating conditions; and
   comparing means for comparing the level signal with the threshold value and generating a signal indicating knocking when the level signal exceeds the threshold value.

2. A knock sensing apparatus as claimed in claim 1, wherein the plurality of sensors comprise:
   rotation sensing means for sensing the rotation of the engine and generating a signal indicative of the rotational speed of the engine; and
   a load sensor for generating a signal indicating the load on the engine.

3. A knock sensing apparatus as claimed in claim 1 wherein the threshold determining means comprises first selecting means for selecting an engine operating region based on the outputs of the plurality of sensors and second selecting means for selecting the threshold value corresponding to the selected operating region.

4. A knock sensing apparatus as claimed in claim 3 wherein:
   the first selecting means comprises means for calculating an engine rotational speed based on a signal from a rotation sensing means and a first memory storing a relationship between the engine rotational speed, engine load, and the engine operating region; and
   the second selecting means comprises a memory storing a relationship between the engine operating region and the threshold value.

5. A knock sensing apparatus as claimed in claim 1 wherein the threshold determining means comprises means for increasing the threshold value as an engine rotational speed increases at a constant engine load and increasing the threshold value as the engine load increases at a constant engine rotational speed.

6. A knock sensing apparatus as claimed in claim 1 further comprising:
   means for generating a noise level signal indicative of the noise level of the engine based on the level signal; and
   threshold correcting means for determining an expected engine noise level and correcting the threshold value when the noise level indicated by the noise level signal differs from the expected engine noise level.

7. A knock sensing apparatus as claimed in claim 6, wherein the threshold correcting means comprises means for multiplying the threshold value from the threshold determining means by the ratio of the noise level indicated by the noise level signal to the expected engine noise level.

8. A knock sensing apparatus as claimed in claim 6, wherein the means for generating a noise level signal comprises a means for averaging the level signal from the level indicating means over a predetermined period.

9. A knock sensing apparatus as claimed in claim 1, wherein the level indicating means comprises a peak hold circuit for generating a peak level signal indicating the peak level of the output signal of the knock sensor over a predetermined period.

10. A knock sensing apparatus as claimed in claim 1, wherein the level indicating means comprises an integrator for integrating the output signal of the knock sensor over a predetermined period and generating an integrated level signal indicated the integrated value.

11. A knock sensing apparatus as claimed in claim 1, further comprising means for retarding an ignition timing of the engine when the signal from the comparing means indicates knocking.

12. A knock sensing apparatus for an internal combustion engine comprising:
a knock sensor that generates an electrical output signal corresponding to vibrations of an engine;
level indicating means for generating a level signal indicating a level of the output signal of the knock sensor during a predetermined period;
a plurality of sensors for sensing an operation condition of the engine based on a plurality of engine characteristics;
threshold determining means responsive to the plurality of sensors for determining a threshold value based on the operating condition;
means for generating a noise level signal indicative of the noise level of the engine based on the level signal;
means for determining an expected engine noise level based on the engine operating condition;
means for correcting the threshold value and calculating a corrected threshold value when the noise level indicated by the noise level signal differs from the expected engine noise level; and
comparing means for comparing the level signal with the corrected threshold value and generating a signal indicating knocking when the level signal exceeds the threshold value means for retarding an ignition timing of the engine when the output signal of the comparing means indicating knocking is generated.

13. A knock sensing method for an internal combustion engine comprising:
sensing vibrations of an engine with a knock sensor and generating an output signal indicative of the sensed vibrations;
generating a level signal indicative of the level of the output signal of the knock sensor during a predetermined period;
calculating a threshold value on the basis of a plurality of engine operating conditions; and
comparing the level signal with the threshold value and determining that the engine is knocking when the level signal exceeds the threshold value.

14. A method as claimed in claim 13, further comprising the steps of:
sensing an engine rotational speed and an engine load of the engine, the engine rotational speed and the engine load representing the plurality of engine operating conditions.

15. A method as claimed in claim 14, wherein the step of calculating the threshold value comprises increasing the threshold value as the engine rotational speed increases at a constant engine load and increasing the threshold value as the engine load decreases at a constant engine rotational speed.

16. A method as claimed in claim 13, further comprising the steps of:
determining an expected noise level based on the plurality of engine operating conditions;
determining an actual engine noise level based on the level signal;
correcting the threshold value when the expected noise level differs from the actual engine noise level.

17. A method as claimed in claim 16, wherein the step of correcting the threshold value comprises multiplying the threshold value by a ratio of the actual engine noise level to the expected noise level.

18. A method as claimed in claim 16, wherein the step of determining the actual engine noise level comprises forming an average of the level signal over a predetermined period.

19. A method as claimed in claim 13, further comprising retarding ignition timing of the engine when it is determined that the engine is knocking.

* * * * *